Feb. 3, 1942.   V. GERICH   2,271,586
CONVERTIBLE AUTOMOBILE JACK AND REAR WHEEL DRIVE MOTOR STARTING DEVICE
Filed Sept. 6, 1940   3 Sheets-Sheet 1
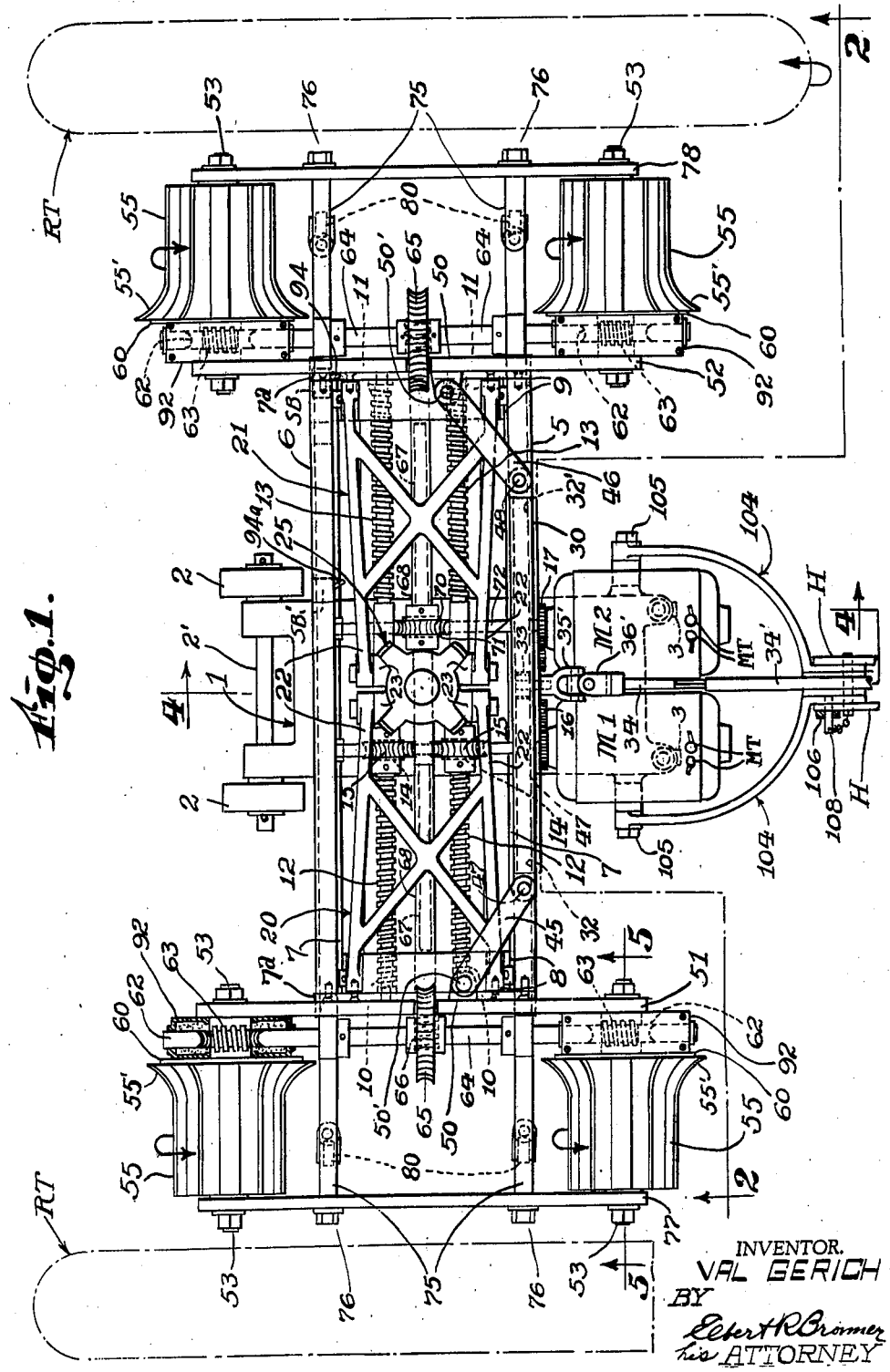
INVENTOR.
VAL GERICH
BY
Ebert R Bromer
his ATTORNEY

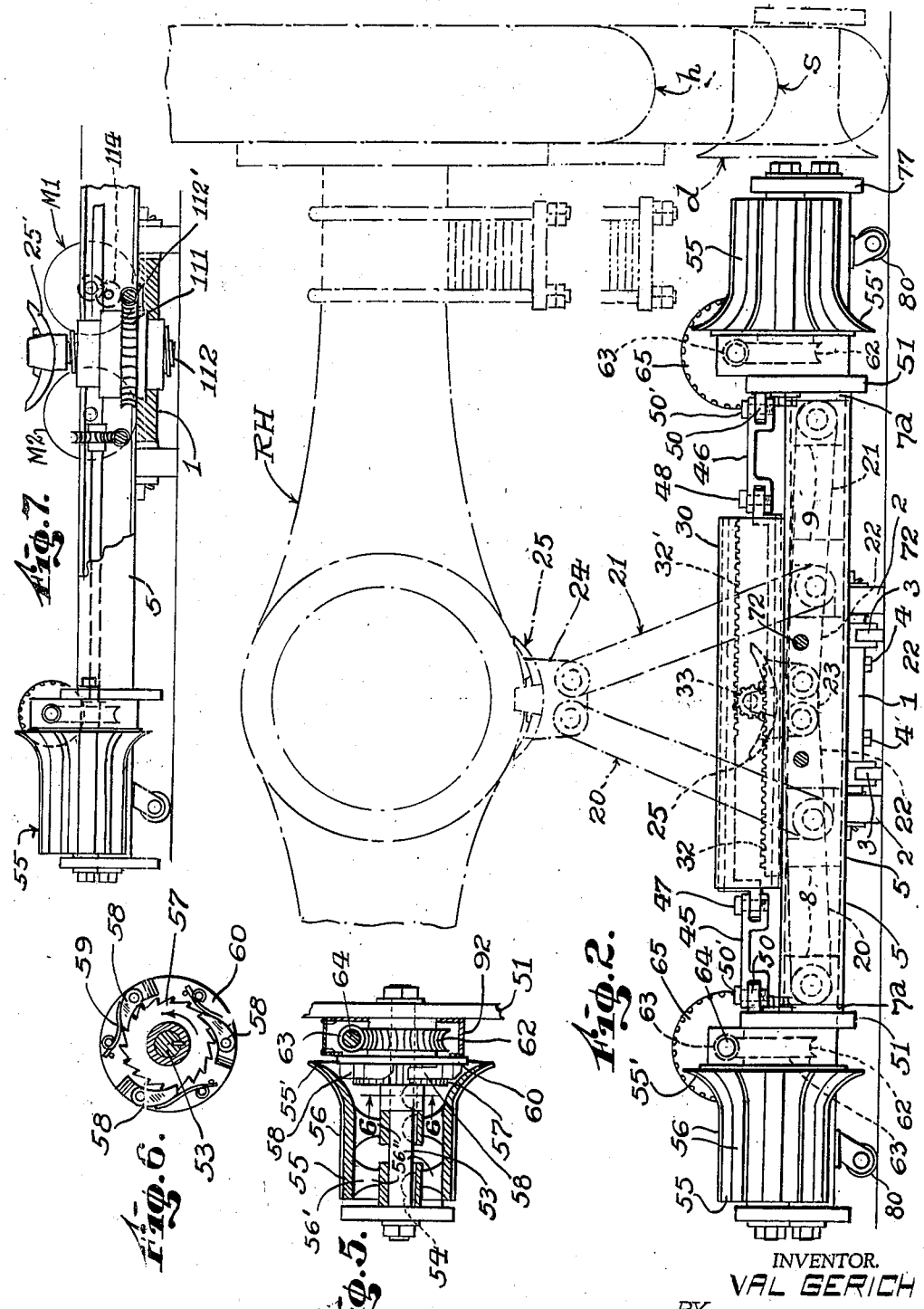

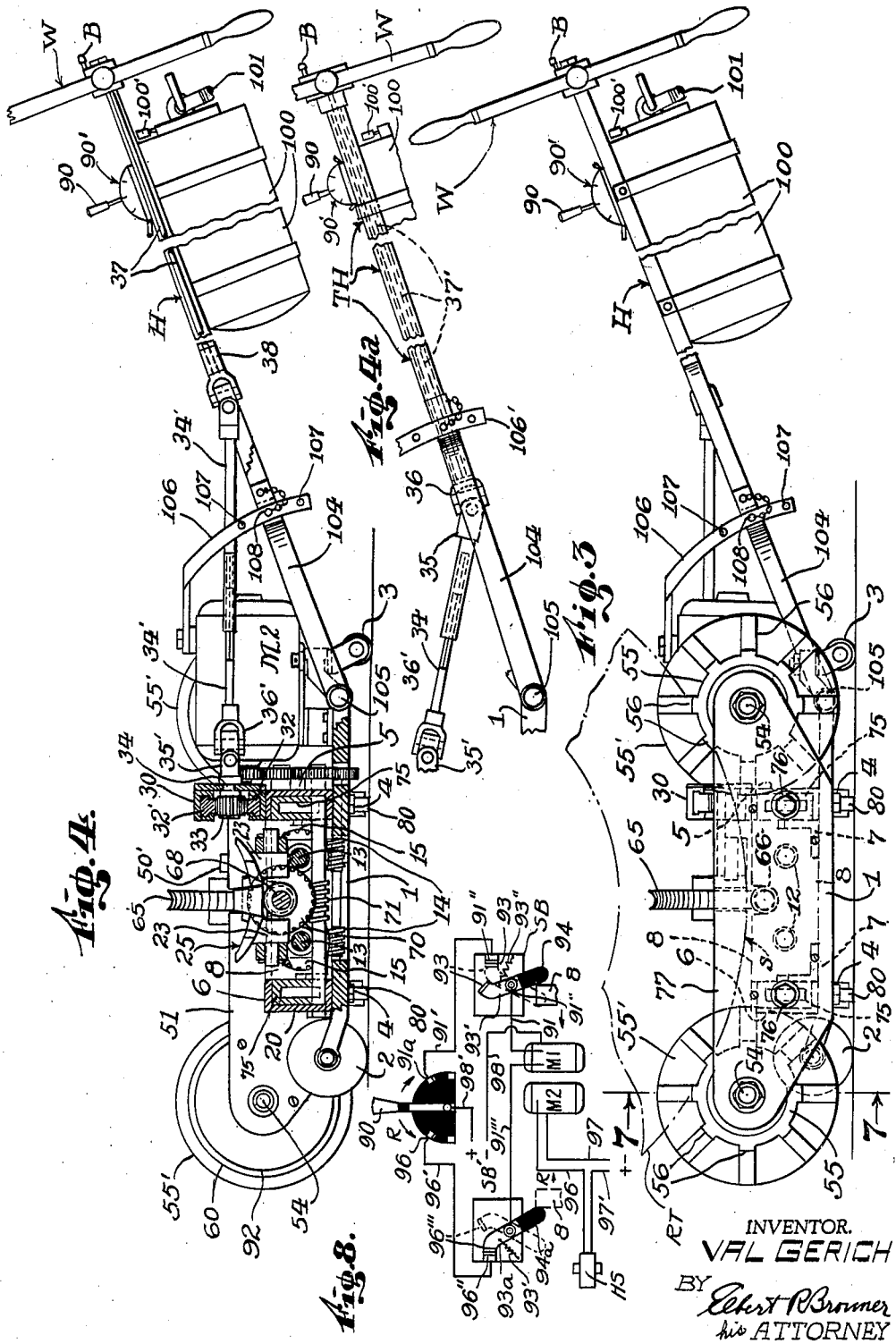

Patented Feb. 3, 1942

2,271,586

UNITED STATES PATENT OFFICE 2,271,586

CONVERTIBLE AUTOMOBILE JACK AND REAR WHEEL DRIVE MOTOR STARTING DEVICE

Valentine Gerich, New York, N. Y.

Application September 6, 1940, Serial No. 355,598

3 Claims. (Cl. 74—14)

This invention relates to a convertible automobile jack and rear wheel drive-motor starting device.

The main salient feature of this invention, is the rear wheel driving mechanism, comprising a left and right pair of drums provided with teeth portions adaptable for extending underneath the rear wheels of an automobile after the rear-housing has been elevated sufficiently for the drums to clear the tires, whereat the jack and the rear housing are lowered until the tires contact the drums whereby the drums may be rotated to provide the necessary sparking efficiency to start the motor of the automobile that is otherwise inoperative, due to a weak battery causing not enough voltage, or for other reasons, and the drum operating and rear wheel driving mechanism adaptable for spotting and timing the motor of the automobile.

Another salient feature of this invention, is the adaptability of using the drum operating mechanism in combination with any kind of a jack for rear-housing elevating, in which means are provided for breaking the circuit of the operating electric motor for the jack operations, and the ratchet-drive for each rotatable drum to allow for any excessive speed and rotation of the rear wheels after the drums have started the wheels turning.

Another important feature of this invention, is the toggle lever mechanism for raising the saddle of the jack, having movable blocks operating onto left and right screw-rods that move towards each other when the toggle levers raise or elevate the saddle, and move away from each other when the saddle is lowered to its normal position, in which the toggle levers are almost in a flat horizontal position thereby providing a low compact jacking device for placing under a very low rear-housing of an automobile for elevating the saddle and rear-housing high enough for the drums to be extended under the tires of the wheels.

Another important feature of this invention is the adaptability of using a screw-jack in place of the toggle lever jack, but there are certain objections that may not allow same for practical use, although it is very possible that a screw-jack or any type of jack may be useful in combination with the drum rotatable mechanism.

Another important feature of this invention, is the adaptability of using a portable dry battery box device in connection with the drum driving operation for the rear wheels to start the motor, in which a portable dry battery box device is connected to the distributor or ammeter, to provide the necessary firing efficiency for the motor.

Another important feature of this invention, is the structural characteristics of the assembled mechanism wherein a lower and more compact jacking device is obtainable over present rear-housing jacks, in which a steering handle and drum spreading mechanism are operable by a wheel at the end thereof, in which a locking arrangement is provided for securing firmly the operating mechanism during the driving operation of the rear wheels by the ratchet-drums for starting the motor of the automobile.

Other features of this invention will appear as the description proceeds in the following specification, accompanied by the annexed drawings, in which—

Figure 1 is a plan view of the complete device of this invention, except the part broken away of the handle, which is clearly shown in Figures 3, 4 and 4a.

Figure 2 is a front elevational view taken on line 2—2 of Figure 1.

Figure 3 is a left end view of the device shown in Figure 1.

Figure 4 is a cross-sectional view on line 4—4 of Figure 1.

Figure 4a is a similar view showing an alternative tube-handle.

Figure 5 is a cross-sectional view longitudinally of one of the drums.

Figure 6 is a cross-section of the same drum on line 6—6 of Figure 5.

Figure 7 is a partial sectional view of an alternative form of a screw-jack mechanism that may be adopted in place of the toggle lever jack.

Figure 8 is a wire diagram of the electrical operating elements.

Referring to the drawings, the numeral 1 indicates a bed-plate frame with wheels 2 mounted on a shaft 2' at one end and casters 3 provided at the other end thereof, which forms the truck of this device. Secured thereto are channel-like frame members 5 and 6 spaced apart sufficiently to provide the necessary operating mechanism of this invention, later to be described.

Guiding plate or angle members 7 are secured to the channel-like members, these members 7 being for operation of the cross-blocks 8 and 9 movable on screw-threaded rods 12 and 13, respectively, in the threaded portions 10 and 11 of the cross-blocks. The screw-rods are operable by a worm gear 14, worm-wheel 15 and the electric motor M1 through suitable reduced gearing, such as 16. The screw-rods 12 and 13 have their ends rotatable in bearings in the plate 7a secured to the ends of the channel-like members 5 and 6, and to the end of the guide plates 7.

Pivotally secured onto these cross-blocks are toggle lever frame members 20 and 21 having side link portions 22 that are also pivotally connected to the under boss portions 23 of the saddle 25 of the jack for elevating the rear housing of an automobile, these toggle frame members being almost flat when in their lowermost position, and are capable of raising or elevating the saddle 25 in a very high position as shown in dotted lines in Figure 2, later to be described in operation.

The drum extending and telescoping mechanism, comprises teeth-rack members 32 and 32' slidable in a track member 30, with a pinion gear 33 meshing in therebetween, the gear 33 being operated by the stub-shaft 34, knuckle-joints 35, 36 and 35', 36' rod-shaft 34' and rod 37 terminating into a bearing of the locking arrangement 38 of the wheel W, all of which are mounted on the handle H having a forked portion 104—104 pivotally connected at 105 to the bed-plate 1. Links 45 and 46 are pivotally connected to the rack-bars 32—32' at 47 and 48 and also are pivotally connected at 50' to the bracket 50 of the cross-plate members 51 and 52, from which are extended the shafts or spindles 53 for the rotatable drums 55.

The semi-spool like drums 55 have curved flanged portions 55', teeth 56, ribbed portions 56', shaft 53 keyed at 54 into the bearings 56'', ratchet 57 engaging pawls or dogs 58 under spring tension at 59 mounted on disk 60 secured to the worm wheel 62, all of which forms the ratchet-drive mechanism of each drum 55, clearly shown in Figures 5 and 6, which allows for excessive speed or rotation of the rear wheels after the motor of the automobile has been started. The worm wheels 62 are operated by the worm gears 63, shafts 64, worm wheels 65, worm gear 66, and telescoping drive members 67 and 68, the inner shaft member 67 being, for example, square fitted and slidable in the outer shaft member 68 which is operated by the worm wheel 70, worm gear 71, shaft 72 and electric motor M2 through a reduced gearing 17.

The main frame members 5 and 6 is provided with extending and telescoping members 75 secured by screws 76 to the outer cross-plates 77 and 78 providing bearings for the shafts 53 having also bearings in the inner cross-plates 51 and 52. Casters 80 may be arranged under the members 75 for each pair of operating drums 55, but other suitable means may be adopted for a firm and level operation of the drums and their mechanism, this being optional, as the extending members 75 have about 7 inches support in the fixed frame members 5 and 6, the members 75 move about 7 inches, making a total of 14 inches or more for these members 75 from the inner cross-plate 52 that support the end frame structure for each pair of drums as shown in Figures 1 and 2.

In Figure 7, for example, a screw jack 112 is shown, that may be adopted in place of the toggle jack hereinbefore described, if so desired, the jack being a double screw sleeve-type in order to get as much elevation as permissible, a worm wheel 111 is operated by the worm gear 112, as for example, by the reduced gearing 114 from the motor M1. Similar means for the circuit breaking of the motor may be used as in the toggle jack of this invention, but is not deemed necessary to show, if the principle is the same as hereinbefore described.

In Figure 8 a wire diagram is shown, in which the motor M1 connects by a wire 91 to the switch box SB having a wire 91' leading to the fixed contact 91'' normally held in contact with the movable contact 93 of the switch lever 93' by a tension spring 93'' within the switch box SB. The contacts 91'' and 93 are broken when the movable block 8 of the toggle, the member 21 moves into contact with the trip lever 94 secured with the switch lever 93', whereby the motor may coast to a stop in the elevating of the saddle 25. When it is desired to lower the saddle 25, the switch lever 90 is moved in direction of arrow R to the fixed contact 96, whereby the block 8 moves outwardly towards the switch box SB' whereat the trip lever 94$^a$ breaks contact points 96'' and 96''', thereby breaking the circuit, at which time the saddle 25 has reached its lowermost position. The switch boxes SB and SB' with their trip levers provide a circuit breaker in event the hand lever 90 is not operated in time. This automatic control is essential as a safety precaution, in event the movable hand switch 90 and fixed contact 91$^a$ connected by wire 91 with the switch box SB to the motor M1, is not operated in time. The motor M2 is connected by a wire 96 to a hand switch HS that is adapted to be held by the operator in the driver's seat, in which the rotation of the drums driving the rear wheels may be controlled at the dash-board panel of the car, to regulate the motor of the car when starting, and the drums 55 are stopped by the switch HS, or turned on, whenever desired. The drums 55 have a grease housing member 92 secured in between the cross-plates 51—52 and ratchet disks 60. The motors M$^2$ and M$^1$ have negative wires 97 and 98, respectively, the positive wires 97' and 98' complete the supply current through the switches HS and 90, respectively. The fixed contact 96 that engages the lever switch 90, is connected to the motor M1 by wires 96' to the fixed contact 96'' of the switch box SB', movable contact 96''' of switch lever 93$^a$, and wire 91''', all of which are similarly operated as the switch box SB as the block 8 moves in and out of engagement with the trip levers 94 and 94$^a$.

A compressed air tank 100 with a gauge 100' may be secured to the handle H, or handle TH, having an extension hose 101 to provide air for the tires, the handles being about four feet beyond the forked portion 104 which is another twenty inches, or enough to clear the motors ML and M2. A quadrant member 106 with spaced holes 107 allows for inserting a pin 108 for different positions of the handles H or TH.

In operation the lower bed-frame truck is positioned under the rear-housing RH of the car, as noted clearly in Figure 2, so the saddle 25 may engage same and the reversible motor M1 is started by the switch lever 90 thereby raising the saddle through the reduce gearing 16, worm gears 14, worm wheels 15 which rotate screw-rods 12—13 that move the blocks 7 and 8 towards each other by means of the toggle members 20 and 21, thereby raising the saddle and rear-housing RH high enough for allowing the drums 55 to be moved under the rear tires RT, as indicated in dotted form at h in Figure 2, the motor M1 being shut off, due to the block 8 contacting the switch arm 94 of the switch box SB, thereby breaking the closed circuit in event the hand lever 90 has not been operated for the same purpose. Then the truck handle wheel W is turned sufficiently to rotate the rod 37, knuckle-joints 36—35—36'—35', driving rod-shafts 34 spur gear 33 and move racks 32—32' which move the cross-plates 51 and 52 by means of the links 45 and 46, thus moving each pair of drums 55 under the rear wheel tires RT as indicated by the dotted positions of the drums at d in Figure 2. Then the motor M1 is reversed to lower the saddle 25 until the rear wheel tires RT rest upon each pair of drums 55, the curved flanged portion 55' of each drum acting as a guide for engaging the curved portions of the tires RT and act as a stop, when the motor M1 is again stopped by the switch SB or switch 90, all of which has been electrically and mechanically described in the wire diagram hereinbefore described.

The motor M2 is now started by the hand switch HS on the end of about a twenty-foot cord extending to the driver's seat from the motor M2 connecting terminals MT, the rod 37 being locked by the button B on the wheel W to a fixed portion of the handle H, so as to secure a firm and sure operation of the drums 55 through the gearing 17, worm 71, wheel 70, shafts 68—67, worms 66, wheels 65, shafts 64, worms 63, wheels 62, disks 60, pawls 58, ratchets 57, the teeth 56 gripping and turning firmly the tires for their rotation for the rear wheel driving mechanism to start the motor of the car, assisted by a portable dry battery device as shown in Figure 9, in which an ordinary portable dry battery box 120 has its positive terminal connected by the deposited wire 121 to the distributor 122, or ammeter at the dashboard of the car, and the negative terminal of the battery box 120 is grounded to the dash or frame at 124 through the wire 123. This provides the necessary sparking voltage in event the car's battery is totally dead. The ratchet-drive of each drum allows for more or less acceleration of the motor power of the car now started by means of the drums 55, and when so desired the motor M2 is stopped by the hand switch HS, when sufficient power has been generated in the generator of the car to supply the necessary voltage current to the battery. Then the operation for elevating the saddle to withdraw the drums 55 from under the rear wheels is repeated, all of which is reversed in operation.

It is to be understood that all parts hereinbefore described and shown in the drawings are more or less illustrative, as an actual device has not been constructed, and any alteration to same is expressly reserved providing same comes within the scope of the appended claims.

Having thus described my invention what I claim as new and desire to secure by Letters Patent, is as follows:

1. In a convertible automobile jack and rear wheel drive and motor starting device of the character described, the combination of a floor truck, a bed-plate therewith provided with wheels and casters, channel-like frame members secured crossway onto said bed-plate, electric motors arranged on said bed-plate, telescoping members arranged within said channel-like members, teeth racks having a spur gear meshing therebetween arranged onto one of said channel-like members, a toggle jack mechanism having movable cross-blocks operable by left and right screw-rods arranged in between said channel-like members, toggle levers pivotally secured to said cross-blocks, said toggle levers further pivotally connected to a saddle member, said saddle member in its lowermost position in between said channel-like members position said cross-blocks at extreme end portion of said channel-like members with said toggle levers almost in their horizontal positions, said saddle being adaptable for positioning underneath the rear housing of an automobile, a pair of drums carried by the free ends of said telescoping members, each of said drums provided with a curved flanged portion and a ratchet drive mechanism, said telescoping members adaptable to be operated by one of said electric motors, said drums and ratchet-drive mechanism adaptable to be driven by the other electric motor, said floor truck provided with a steering handle, said handle provided with a rotatable wheel at the upper end thereof, said wheel through connecting mechanism adaptable to operate said spur gear and teeth-racks and each pair of drums connecting therewith, means to operate first said motor and said toggle operating mechanism whereby said saddle elevates said rear-housing of car, means to break the power circuit of said motor, when saddle is sufficiently elevated, each of said pair of drums provided with teeth portions, said wheel of handle adaptable to move each pair of drums underneath the tires of the rear wheels of the car, means to reverse said motor to lower said saddle member, and said rear-housing so the tires may rest upon each pair of drums, means to break the circuit of said motor, means to operate said other motor for rotating said drums through said ratchet-drive whereby the dead motor of the car may be started through the rotation of said drums contacting said tires of the rear wheels of said car, said ratchet-drive allowing for excessive speed of rear wheels after the motor has been started and during the rotation of said drums for generating power to the generator of said car for the sufficient voltage to normally operate said motor of car, after which said other motor is shut-off and all operating mechanism is now reversed to return the drums to their normal positions in which the toggle jack mechanism is again operated for elevating the rear wheels sufficiently for the withdrawal of said drums.

2. In a convertible automobile jack and rear wheel drive and motor starting device of the character described, the combination of a floor truck, electric motors arranged thereon, said truck provided with a handle and wheel at the end thereof, frame members secured crossway of said truck, telescoping members arranged in said frame members, cross-blocks operable in between said frame members, said cross-blocks operable by screw rods, toggle levers pivotally secured to said cross-blocks, a saddle member pivotally secured to the other end of said toggle levers, said toggle lever being in almost a horizontal position when said saddle is in its lowermost position with said cross-blocks at their extreme outwardly position in between said frame members, said telescoping members provided with a pair of drums arranged at the free ends thereof, means to operate one of said electric motors to operate said screw-rods and cross-blocks whereby the said saddle member is elevated underneath the rear-housing of a car, means to operate the other motor to raise said rear-housing of car off floor, means to operate said wheel of said handle to move outwardly said telescoping members whereby each of said pair of drums are positioned under the rear wheels of the car, means to lower said saddle and rear housing for rear wheels to rest upon said drums, means to break the circuit of said electric motor, means to operate said other motor for rotating said drums for the rotation of said rear wheels for starting the motor of the car and for generating power voltage to the generator of the car to normally operate said motor of car, and means to make inoperative the rotation of said drums, and for withdrawal of said drums from under the rear wheels to their inoperative and normal positions.

3. In a convertible automobile jack and rear wheel drive and motor starting device of the character described, the combination of a floor truck, a motor power means arranged thereon, said truck provided with a steering handle at the end thereof, frame members secured onto said truck, movable and extendable members arranged in said frame members, movable cross-blocks operable in between said frame members, said cross-blocks operable by toggle levers pivotally secured to said cross-blocks, a saddle member pivotally secured to the other end of said toggle levers, said toggle levers being in almost a horizontal position when said saddle is in its lowermost position with said cross-blocks at their extreme outward position in between said frame members, said extendable members provided with a pair of drums arranged at the free ends thereof, means to operate said movable cross-blocks towards each other whereby said saddle member is elevated underneath the rear-housing of a car, means to raise said rear-housing of car off floor, means to operate said extendable members whereby each of said pair of drums are positioned under the rear wheels of the car, means to lower said saddle and rear housing for rear wheels to rest upon said drums, means to operate said motor for rotating said drums for the rotation of said rear wheels for starting the motor of the car and for generating power voltage to the generator of the car to normally operate said motor of car, and means to make inoperative the rotation of said motor and drums, and for the withdrawal of said drums from under the rear wheels to their inoperative and normal positions.

VALENTINE GERICH.